United States Patent [19]

Guiles

[11] Patent Number: 4,791,439

[45] Date of Patent: Dec. 13, 1988

[54] INK JET APPARATUS WITH IMPROVED RESERVOIR SYSTEM FOR HANDLING HOT MELT INK

[75] Inventor: Joseph W. Guiles, Prospect, Conn.

[73] Assignee: Dataproducts Corporation, Woodland Hills, Calif.

[21] Appl. No.: 885,966

[22] Filed: Jul. 15, 1986

[51] Int. Cl.⁴ .................... G01D 15/16; F27B 14/00; B67D 5/62

[52] U.S. Cl. .................... 346/140 R; 219/421; 222/146.5

[58] Field of Search ............ 346/1.1, 140 PD, 76 PH; 400/120; 219/421; 222/146.5, 146.1

[56] References Cited

U.S. PATENT DOCUMENTS

| | | | |
|---|---|---|---|
| 3,964,645 | 6/1976 | Scholl | 222/146.5 |
| 4,308,447 | 12/1981 | Notzold | 219/421 |
| 4,607,266 | 8/1986 | DeBonte | 346/140 |
| 4,666,066 | 5/1987 | Boccagno | 219/421 |

*Primary Examiner*—E. A. Goldberg
*Assistant Examiner*—Mark Reinhart
*Attorney, Agent, or Firm*—Woodcock Washburn Kurtz Mackiewicz & Norris

[57] ABSTRACT

Ink jet apparatus for use with hot melt ink has an integrally connected ink jet head and reservoir system, the reservoir system including a highly efficient heat conducting plate, such as aluminum, inserted within an essentially non-heat conducting reservoir housing. The reservoir system has a sloping flow path between an inlet position and a sump from which ink is drawn to the head, and includes a plurality of vanes situated upon the plate for rapid heat transfer.

14 Claims, 2 Drawing Sheets

INK JET APPARATUS WITH IMPROVED RESERVOIR SYSTEM FOR HANDLING HOT MELT INK

BACKGROUND OF THE INVENTION

This invention relates to ink jet apparatus having a movable ink jet head for ejecting droplets of ink, and more particularly to such apparatus having a reservoir for supplying hot melt ink to the ink jet head.

The use in ink jet systems of hot melt ink, which ink is normally in a solid or frozen state but attains a liquid state or phase when its temperature is raised, has presented a number of advantages to ink jet apparatuses. For a discussion of the characteristics of such ink and the use thereof in ink jet apparatus, reference is made to U.S. Pat. No. 4,390,369 and pending U.S. application Ser. Nos. 093,151 filed Sept. 2, 1987, which is a continuation of Ser. No. 938,334, filed Dec. 4, 1986, and now abandoned, which in turn is a continuation of Ser. No. 610,627 filed May 16, 1984, now abandoned; Ser. No. 909,007, filed Sept. 16, 1986, which is a continuation of Ser. No. 803,038, filed Nov. 27, 1985, and now abandoned, which in turn is a continuation of Ser. No. 565,124, filed Dec. 23, 1983, now abandoned; and Ser. No. 644,542, filed Aug. 27, 1984, now U.S. Pat. No. 4,659,383 all assigned to the same assignee as this invention and incorporated herein by reference.

While the use of hot melt ink has presented advantages as discussed in the above references, it also creates additional requirements for the design of the apparatus, including with respect to the reservoir system. The reservoir which is part of the movable apparatus for devices such as ink jet printers, must be designed to maintain all of the ink in the reservoir at a substantially constant and uniform temperature so that the ink characteristics do not vary. Furthermore, there is a need to reduce fluid flow lengths, to protect against spillage of ink causing subsequent injury to the operator, and to maintain a substantially constant head of ink pressure regardless of movement of the reservoir.

One suitable such printer is described in copending U.S. application Ser. No. 829,572, filed Feb. 14, 1986, assigned to the assignee of the present invention and incorporated herein by reference. In that arrangement, an ink jet apparatus of the demand or impulse type comprises a chamber and an orifice from which droplets of ink are ejected in response to the state of energization of a transducer which communicates with the chamber through a foot forming a movable wall. The transducer expands and contracts, in a direction having at least one component extending parallel with the direction of droplet ejection through the orifice, and is elongated in such direction, the electric field resulting from the energizing voltage being applied transversed to the axis of elongation. Also provided for in that arrangement is a supply means of hot melt ink comprising a substantially cylindrically shaped pellet formed within a cartridge which is inserted within a receptacle for subsequent melting. In this manner, an operator is less likely to be burned by spilling ink since the ink is supplied to the printer in a cartridge form which is adapted to seal the ink supply, and thereby prevent spillage.

One of the major difficulties to the convenient use of hot melt inks in an ink jet device has been how to prevent the devices from depriming while cycling from their elevated operating temperatures to room temperature and back, through the melting/freezing temperature range of the ink. Numerous experiments have shown that even when a device is properly primed (i.e., filled and operating well with hot melt ink), cooling below the freezing temperature and warming it back to the operating temperature will often deprime it.

This phenomenon may be caused by several different effects. In one case, the ink may contract gradually as its temperature falls, resulting in a situation where the shrinking solid may either crack or fail to adhere to the ink passage walls thereby allowing air to penetrate the system. Furthermore, substantial shrinkage of the freezing ink may also pull air in through the ink jet orifices. Atmospheric gases, as well, can dissolve in the ink and cause bubbles to form on reheating since most gases are much less soluble in the solid ink than in the melted ink.

While the device of copending U.S. application Ser. No. 829,572 described herein above is suitable for use with hot melt ink, it nevertheless is susceptible to such depriming for the reasons discussed immediately above. It would, therefore, be desirable to provide an improved reservoir system which could be integrally mounted with the ink jet head, and which would provide optimum flow of the hot melt ink to the ink jet head while minimizing the effects of depriming caused by the freezing of the ink.

SUMMARY OF THE INVENTION

Accordingly, it is an object of this invention to provide a reservoir for use in supplying hot melt ink to the ink jet head of an ink jet apparatus, wherein the reservoir system efficiently supplies ink to the head at a desired flow rate while maintaining the ink at a substantially constant pressure head and uniform temperature.

It is another object of this invention to provide a reservoir system for use with an ink jet apparatus, which reservoir system is adapted to overcome the problems of carrying hot melt ink in a moving housing.

It is a further object of this invention to provide an ink jet apparatus with an improved reservoir for efficiently supplying hot melt ink through an optimally short flow path while maintaining the desired operating characteristics of the hot melt ink.

It is yet a further object of this invention to provide an ink jet apparatus having an improved reservoir and ink supply system which is capable of rapidly melting the ink to overcome problems caused by inoperation of the ink jet apparatus and freezing of the ink.

In accordance with the above and other objects, the ink jet apparatus of this invention is provided with first reservoir means, including heater means, for containing a supply of ink, and second reservoir means, substantially surrounding the first reservoir means, for maintaining the supply of ink. The first reservoir means is comprised of an efficient heat conductive plate which is inserted within the second reservoir means, and a heater in good thermal connection with the plate. The second reservoir means is an essentially non-heat conducting material which both houses the plate comprising the first reservoir means and provides an inlet location where the ink may be supplied.

In accordance with one important aspect of the invention, the plate comprising the first reservoir means includes an upper portion having a platform for supporting and melting the ink, supplied in cartridge form, and a plurality of vanes sloping down toward a sump, located in a lower portion of the plate, which provides a constant source of ink under even the most extreme tilting or transient motion conditions. The sump is located very close to the ink jet head so as to optimize the fluid compliance seen at a manifold which feeds the ink jet array. According to one further important aspect of the invention, the manifold which feeds the ink jet array is comprised of an efficient heat conductive material imbedded within an essentially non-heat conducting body attached to the ink jet head.

Other objects, advantages and novel features of this invention will become apparent from the following detailed description of a preferred embodiment when considered in conjunction with the accompanying drawings wherein:

DETAILED DESCRIPTION OF THE PREFERRED EMBODIMENT

Figure 1:
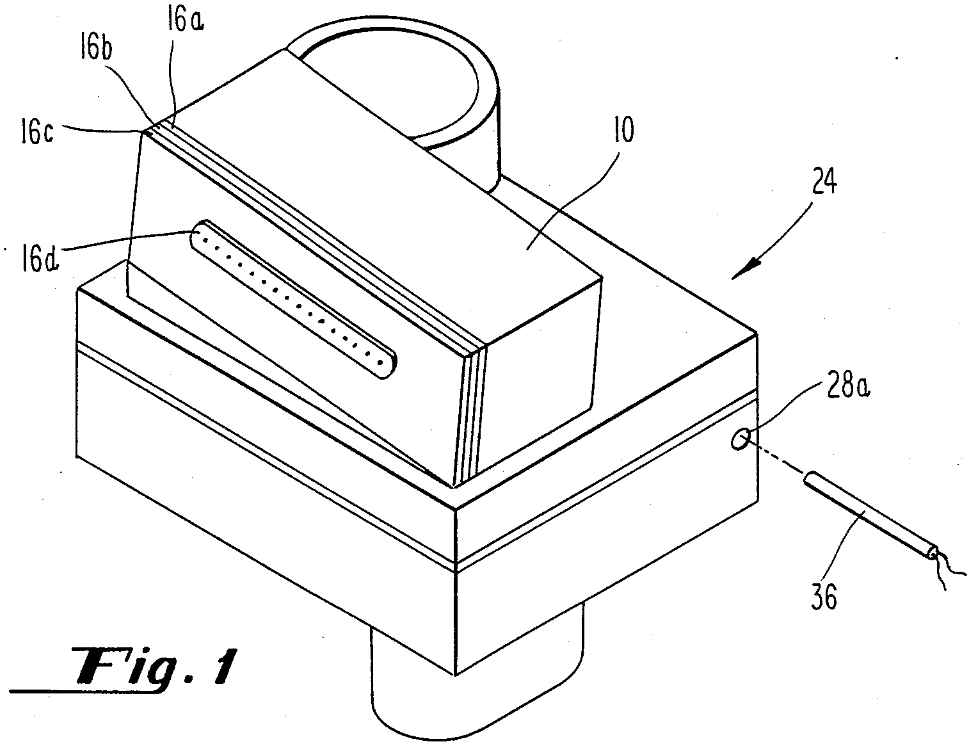
FIG. 1 is a diagrammatic perspective view of an ink jet apparatus utilizing the reservoir system and foot body of the present invention.

Referring now to the drawings, wherein like characters designate like or corresponding parts throughout the several views, there is shown in FIG. 1 an impulse or drop-on-demand ink jet print head 10 including a reservoir 12 which supplies ink through a manifold 14 (FIG. 3) to a fluidic portion 16 comprised generally of a plurality of plates 16*a*, 16*b*, 16*c*, and 16*d*, attached to a forward face 18 of the print head 10 as is more fully described herein below.

A plurality of transducers are mounted within the print head 10 in a manner consistent with the disclosure of U.S. Pat. No. 4,459,601, assigned to the assignee of the present invention and incorporated herein by reference. That is, each of the transducers 20 expand and contract in a direction having at least one component extending parallel with the direction of droplet ejection through the orifices in orifice plate 16*d*, and are elongated in such direction, the electric field resulting from an energizing voltage being applied transverse to the access of elongation at an electrical connection (not shown). Furthermore, the transducers 20 at their free ends are each connected to a respective transducer foot 22 for coupling with the ink jet chambers, formed by the chamber plate 16*b*, by an elastomeric potting compound such as silicone rubber. This "potted foot" configuration is presently preferred over diaphragm designs illustrated in the aforementioned references for reasons of reliability and durability. One suitable method of manufacturing and mounting such transducers 20 is disclosed fully in copending application Ser. No. 902,473, filed Aug. 29, 1986, which is assigned to the assignee of the present invention and incorporated heren by reference.

The print head 10 is both mounted upon, and provided its supply of ink from, a reservoir system 24 in accordance with the present invention. As is shown more clearly in FIG. 2, the reservoir system 24 generally comprises first reservoir means in the form of a efficient heat conductive plate 26 which is inserted within second reservoir means comprising a reservoir base 28 and a reservoir cover 30. Both of the reservoir base 28 and cover 30 may be molded from a non-heat conducting material such as polymer resin in solid form (e.g., nylon) to contain the plate 26 and prevent burn injuries to an operator when the plate 26 is heated.

The plate 26 is constructed of a highly efficient heat conductive material, such as aluminum, and is comprised generally of an upper portion 32 including a melting platform 32*a* and a plurality of heat conducting vanes 32*b*, and a lower portion 34 comprised of a sump 34*a*. A heater 36 is inserted within a hole 26*a* within the plate 26 such that, upon operation of the heater 36, the entire plate 26 including the sump 34*a* is adequately heated. Any conventional temperature sensor (not shown) may be suitably positioned in the plate 26 to monitor the temperature and provide feedback to a control (not shown) to maintain the heater temperature.

The vanes 32*b* are shown extending from side-to-side of the plate 26, and being integrally connected to the plate 26 along their length so as to provide both mechanical and thermal connection between the plate 26 and the vanes 32*b*. The vanes 32*b* are made of a highly efficient heat conductive material, preferably aluminum, and in the preferred embodiment, are formed in a one-piece mold with the plate 26. As used herein, the phrase "thermal connection" means that the element is connected so that there is no significant impedence to heat transfer. In this sense the vanes 32*b* are in thermal connection with the heater 36 through the plate 26.

Figure 2:
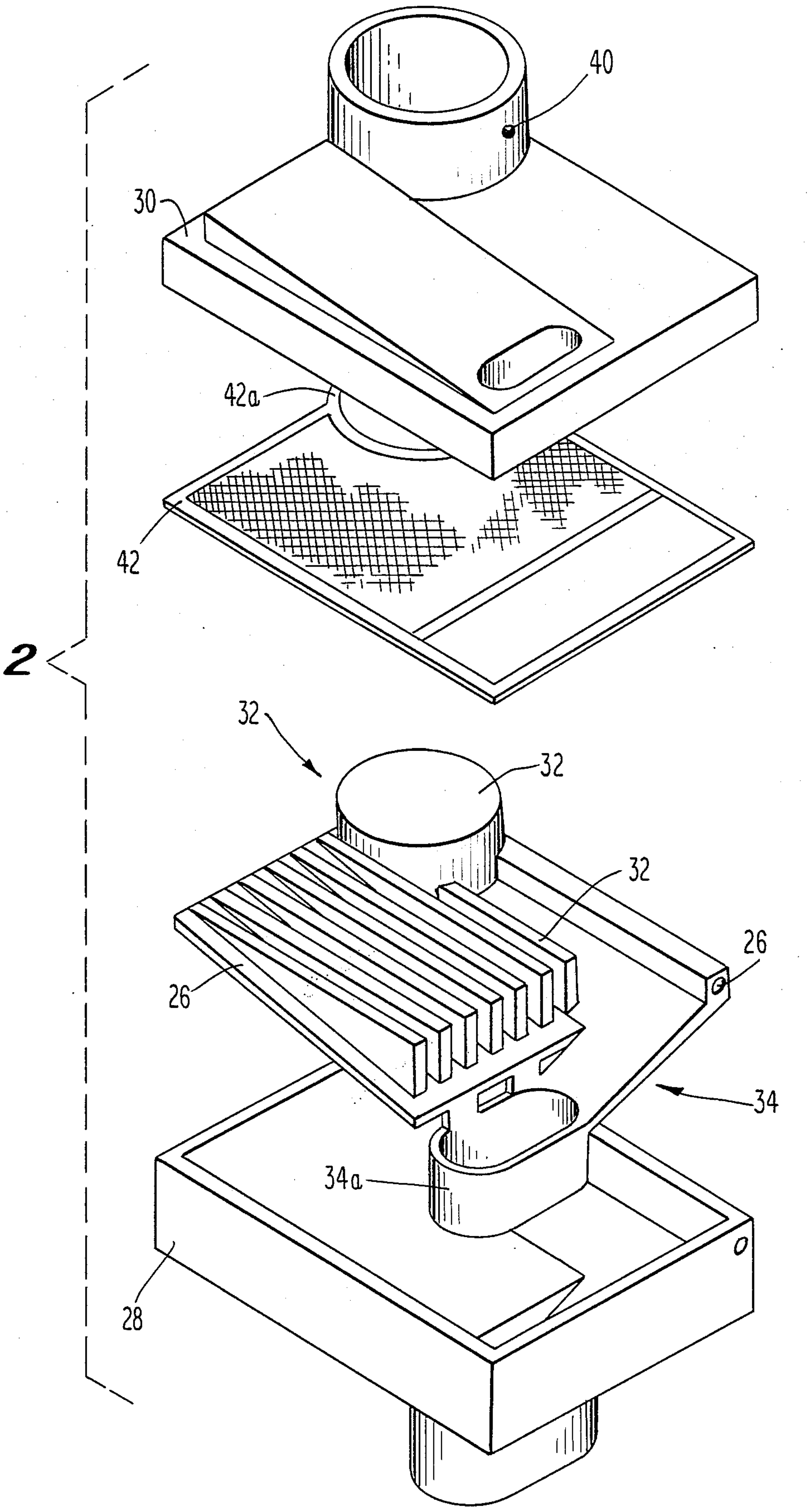
FIG. 2 is an exploded view of the reservoir system of FIG. 1.

As is described in copending U.S. application Ser. No. 661,923, filed Oct. 16, 1984, now U.S. Pat. No. 4,580,147 assigned to the assignee of the present invention and incorporated herein by reference, a vent 40 may be provided within the reservoir system 12 in order to provide a source of atmospheric pressure thereto. In such a manner, the vanes 32*b* promote not only a meas for conducting heat from the heater 36 to the ink, but also permits bubbles which have developed in the ink at any point in the reservoir system 12 to pass up and exit through the vent 40. Also, while seven vanes 32*b* are shown in FIG. 2, it is to be understood that fewer or more than seven vanes 32*b* may be utilized. Furthermore, the vanes 32*b* need not be planar as indicated, but can be constructed with different contours so long as they optimize heat conductivity to all of the ink within the reservoir system 12 and permit the rapid exit of air through the vent 40.

In order to assemble the reservoir system 12 according to this invention, the reservoir base 28 is first molded from a suitable polymer resin in solid form (e.g., nylon) to permit insertion of the aluminum plate 26 therein. A hole 28*a* is advantageously positioned to permit insertion of the heater 36 through the reservoir base 28 into the plate 26. After insertion of the plate 26 within the reservoir base 28, a filter 42, for preventing the transmission of particulate matter into the sump 34*a*, may be solvent bonded to the reservoir base 28, and may be similarly bonded to the reservoir cover 30 to provide a self-contained reservoir system 12. It should be noted, that the filter 42 includes a ring portion 42*a* in order to mount it around the melting platform 32*a*. As an alternative, the reservoir base 28, filter 42, and reservoir cover 30 may be ultrasonically welded together to provide a complete seal.

Figure 3:
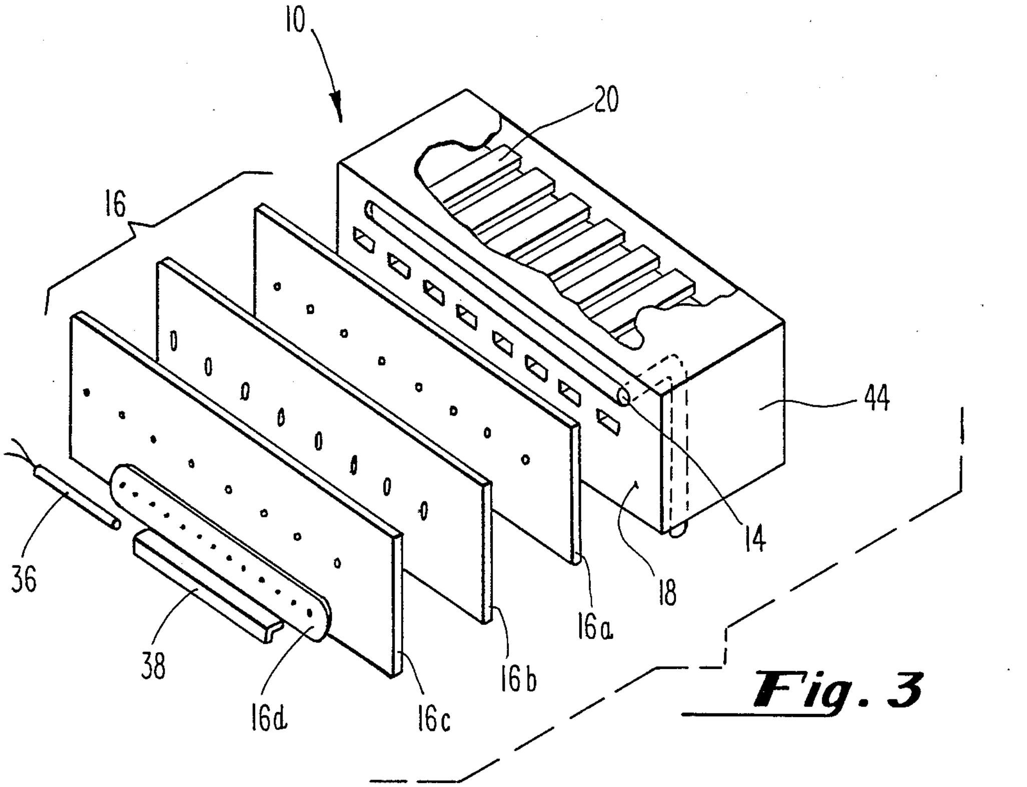
FIG. 3 is an exploded view of the foot body, and associated fluidic components, shown in FIG. 1.

With reference to both FIGS. 2 and 3, it can be seen that the sump 34*a* is provided at a lower section of the reservoir system 12, and is designed to maintain a source of ink regardless of movement or tilting of the apparatus. An inlet pipe or manifold 14 extends down into the sump, and provides passage of the ink up through the cover 30 of the reservoir into the print head 10. The manifold 14 is preferably limited to about one inch in length, and is comprised of a highly efficient heat conducting material such as aluminum. The manifold 14 is insert molded within a foot body 44 comprised of an essentially non-heat conducting material such as the polymer resin used for the reservoir system 12. Thereafter, the foot plate 16*a*, comprised generally of an electroformed aluminum plate, is bonded to the foot body 44 by means such as epoxy resin. The restrictor plate 16*b*, the chamber plate 16*c*, and orifice plate 16*d* are subsequently mounted to the foot plate 16*a* by known suitable means in order to complete the fluidic portion 16 upon the print head 10. As is shown in FIG. 3, the chamber plate 16*c* which is preferably aluminum may also be formed with an additional mass 38 at its lower periphery to mount a conventional resistive heater similar to that shown at 36. In such a manner, the restrictor plate 16*b* and orifice plate 16*d* (both of which are preferably stainless steel) will be heated by means of metal-to-metal contact with the aluminum foot plate 16*a* and chamber plate 16*c*.

As is apparent from the foregoing, the reservoir system 12 provides a means for quickly heating a supply of hot melt ink in the solid state form in order to provide a continuous supply of liquid ink to the print head 10. Since only a minimal portion of the reservoir system 12 is comprised of a heat conducting material, the system 12 requires less power and time to heat the supply of hot melt ink, and also provides a means of protection to the operator of such an apparatus from burn hazards encountered during loading and operation of the apparatus. Tests between an apparatus consistent with the present invention and a comparable apparatus conventionally constructed entirely from aluminum show that the device according to the present invention heats up to its operating temperature from three to four times faster than its all aluminum counterpart without ink, and more than twice as fast with ink. Ink, which may conveniently be in the form of a cartridge, is first loaded upon the platform 32*a* where it is melted by actuation of the heater 36, collecting in the sump 34 as a low-level supply of ink to the print head 10. If, in the event that the apparatus is turned off, the supply of ink solidifies, the low mass characteristic of the reservoir system 12 of this invention allows the solid ink to be quickly heated, liquified, and supplied to the fluidic portion 16. Moreover, the incorporation of component parts which are mostly comprised of a non-heat conducting polymer resin promotes a low-cost, easy to fabricate assembly which protects the operator from burn hazards and retains heat due to its insulating nature.

While a particular embodiment of the invention has been shown and described, and various modifications suggested, it will be appreciated that other embodiments and modifications which fall within the true spirit and scope of the invention as set forth in the appended claims will occur to those of ordinary skill in the art.

What is claimed is:

1. An ink jet apparatus for use with hot melt ink, comprising:

movable means for ejecting droplets of ink from at least one orifice;

supply means, coupled to said movable ejecting means, for providing ink in its liquid state to said movable ejecting means;

first low-mass reservoir means, including heater means for melting the ink, for containing a supply of ink; and second low-mass reservoir means, substantially surrounding said first reservoir means and supporting said movable ejecting means for movement therewith, for maintaining said supply of ink at a substantially constant head of ink pressure regardless of the movement of said first and second reservoir means, wherein said second reservoir means comprises a non-metallic base formed to hold said first reservoir means therein, and a non-metallic cover attached to said base thereby sealing said first reservoir means and its associated supply of ink.

2. An ink jet apparatus according to claim 1, wherein said cover further comprises:

receptacle means for loading ink in its solid state, said receptacle means providing thermal contact with said first reservoir means such that, upon energization of said heater means, the ink is changed from its solid state to its liquid state.

3. An ink jet apparatus according to claim 1, wherein said base and said cover comprise:

a heat-resistant polymer resin in solid form.

4. An ink jet apparatus according to claim 3, wherein said heat-resistant polymer resin is nylon.

5. An ink jet apparatus according to claim 1, further comprising:

filter means attached between said base and said cover for preventing the transmission of particulate matter to said sump.

6. An ink jet apparatus according to claim 2, wherein said receptacle means is adapted to contain ink in an solid-state cartridge form.

7. An ink jet apparatus according to claim 3, wherein first reservoir means comprises:

an aluminum heat exchanger having a first portion formed therein to contain a low-level supply of ink and a second portion above said first portion and draining thereto for melting said supply of ink and maintaining said melted supply of ink in its liquid state upon energization of said heater means.

8. An ink jet apparatus according to claim 4, wherein said supply means comprises:

a heat conducting tube in thermal contact with said heater means, said tube being formed within a non-heat conducting body and leading from said first reservoir means to said ejecting means.

9. An ink jet apparatus according to claim 8, wherein said ejecting means comprises:

a metallic foot plate bonded to said body;

means for forming at least one variable volume chamber, said chamber forming means attached to said foot plate, and including another heater means; and a metallic orifice plate, containing said at least one orifice, attached to said chamber forming means.

10. An ink jet apparatus according to claim 9, wherein said chamber forming means includes a restrictor plate and a chamber plate both of which provide metal-to-metal contact between said orifice plate and said foot plate.

11. A hot melt ink jet apparatus, comprising:

a scanning ink jet print head having at least one chamber and a respective orifice from which droplets of ink are ejected in response to the state of energization of a transducer which communicates with said chamber through a foot forming a movable wall, thereby varying the volume of said chamber, said at least one chamber and its respective orifice being formed by a metallic foot plate bonded to a lightweight, insulating body, metallic chamber forming means attached to said foot plate, said chamber forming means including a heater, and a metallic orifice plate containing said orifice attached to said chamber forming means;

first reservoir means, including another heater, for containing a supply of liquid ink;

second reservoir means, substantially surrounding said first reservoir means and supporting said scanning ink jet print head for movement therewith, for maintaining said supply of liquid ink at a substantially constant head of ink pressure regardless of the movement of said first and second reservoir means; and a heat-conducting tube in thermal contact with said other heater, said tube being formed within said lightweight, insulating body supplying ink at said substantially constant head of ink pressure from said first reservoir means to said chamber.

12. The apparatus according to claim 11, wherein said lightweight, insulating body comprises a heat-resistant plastic.

13. The apparatus according to claim 12, wherein said second reservoir means a heat-resistant plastic.

14. The apparatus according to claim 11, further comprising restricted inlet means between said chamber and said tube.

* * * * *